United States Patent [19]
Nakatani

[11] Patent Number: 4,596,484
[45] Date of Patent: Jun. 24, 1986

[54] LOCK FOR TELESCOPING TUBULAR SUPPORT
[75] Inventor: Koma Nakatani, Tokyo, Japan
[73] Assignee: Velbon International Corporation, Torrance, Calif.
[21] Appl. No.: 657,933
[22] Filed: Oct. 5, 1984
[51] Int. Cl.[4] .......................... F16B 7/10; F16D 1/12
[52] U.S. Cl. ................... 403/104; 403/109; 403/110; 403/374; 403/377; 248/188.5; 248/411
[58] Field of Search ............... 403/104, 110, 374, 330, 403/377, 109; 248/411, 188.5, 336, 337

[56] References Cited
U.S. PATENT DOCUMENTS

| 2,817,548 | 12/1957 | Uthemann | 403/104 |
| 3,319,339 | 5/1967 | Marconi | 403/104 |
| 4,180,346 | 12/1979 | Blake | 403/109 |
| 4,385,849 | 5/1983 | Crain | 403/109 |
| 4,430,017 | 2/1984 | Stefancich | 403/104 |

FOREIGN PATENT DOCUMENTS

| 2632526 | 1/1978 | Fed. Rep. of Germany | 403/109 |
| 1309598 | 12/1964 | France | 403/110 |
| 1400184 | 12/1965 | France | 403/110 |

Primary Examiner—Cornelius J. Husar
Assistant Examiner—Peter M. Cuomo
Attorney, Agent, or Firm—Beehler, Pavitt, Siegemund, Jagger & Martella

[57] ABSTRACT

A lock for a tubular telescoping support such as tripod leg includes a clamping lever for locking inner and outer members against telescoping displacement and load bearing portions interposed between the two members such that the locking force applied by the clamp is circumferentially distributed among the clamp and two load bearing portions to thereby prevent flattening of the inner tube under locking clamp force.

19 Claims, 5 Drawing Figures

LOCK FOR TELESCOPING TUBULAR SUPPORT

BACKGROUND OF THE INVENTION

1. Field of the Invention

The present invention pertains generally to extendable supports and mechanisms for locking the same at arbitrarily extended positions, and is more particularly directed to a lock for a telescoping tubular leg, particularly for use in a tripod of the type used in photographic or cinematographic applications among others.

2. Background of the Invention

Tripod legs typically consist of a number of telescoping tubular sections of successively smaller cross section, each section being slidable within a larger section. Each section, except the smallest, is provided with a lock for locking together each connected pair of tubular sections against telescoping sliding movement so that the support or tripod may be fixed at any desired height within the limits of the extendable support. Existing tripod leg locks typically have included a camming lever mounted to the larger diameter tube section. The lever was pivotable into camming engagement with the inner, smaller diameter tube through an opening in the outer, larger diameter tube. These locks had the effect of applying localized force by the cam lever on one side of the inner tube, which was thus wedged against the opposite inner surface of the larger diameter tube. The locking force is thus applied at diametrically opposed points of the inner tube. If the inner tube is made of thin material, there is a possibility of deforming or flattening the inner tube.

SUMMARY OF THE INVENTION

The improved locking mechanism disclosed herein overcomes these and other shortcomings of the prior art by distributing the locking pressure exerted on the inner tube section of the extendable support over a greater area of the tube than has been previously possible, and more particularly by distributing the locking force among at least three circumferentially spaced areas of the inner tube to thereby prevent deformation or flattening of the inner tube, even if it is of relatively thin wall thickness or has an oval cross section.

The lock comprises a window opening defined in the outer tube, load bearing means interposed between the inner and the outer tubes, the load bearing means being disposed circumferentially so as to define an axially extending recess diametrically opposed to the window opening, and lever means for applying radially inward locking force against the inner tube through the window opening, thereby to wedge the inner tube against the load bearing means on either side of the recess.

Desirably the load bearing means and the lever by means of which the telescoping support is locked, are all approximately circumferentially equidistant from each other so as to balance the forces acting radially inwardly on the inner tube.

In a presently preferred embodiment of the invention the load bearing means take the form of a generally cylindrical sleeve inserted coaxially between the inner and the outer tubes. The sleeve has a second window opening aligned with the aforementioned window opening in the outer tube. The sleeve may be split longitudinally or, in the alternative, may have a longitudinally extending wall portion of reduced thickness so as to define a recess diametrically opposed to the aligned windows. When the inner tube is wedged against the sleeve and into the recess, it finds no support at a point diametrically opposed to the designed window openings, and is thus supported by the sleeve portions of greater thickness adjacent to either side of this recess. By properly sizing and proportioning the sleeve insert, the locking forces can be distributed among three different points symmetrically disposed about the tube circumference.

The lever means may comprise a camming lever pivotably mounted between the arms of a U-shaped band extending about the outer tube such that the center portion of the band is drawn against the window opening upon actuation of the camming lever, thereby to apply locking force to the inner tube through said window opening. The locking mechanism may be secured against rotation as well as axial translation relative to the outer tube by cooperation of the U-shaped band, the window opening, and the lever mechanism, so that no special fasteners or adhesives are required for assembly of the telescoping support.

DETAILED DESCRIPTION OF THE PREFERRED EMBODIMENTS

Figure 1:
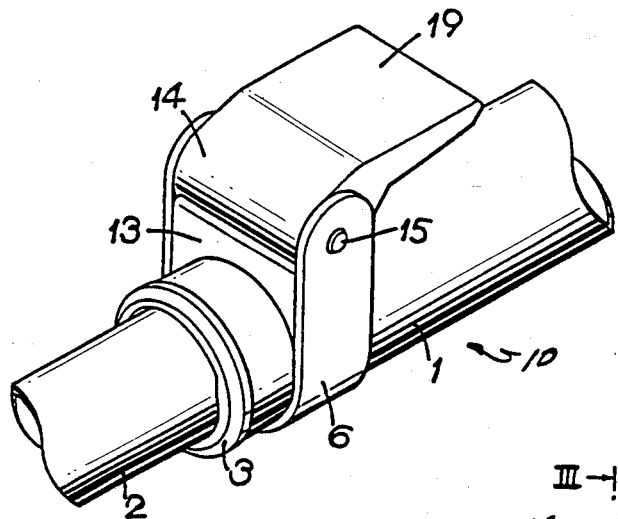
FIG. 1 is a perspective view of a lock according to this invention installed on a telescoping tubular support such as a tripod leg.

With reference to the drawings generally and FIG. 1 in particular a lock mechanism 10 is affixed to the outer tube 1 within which is telescopically slidable an inner tube 2 of reduced diameter. The lock comprises a camming lever 19 provided with a cam element 14 mounted by means of a shaft 15 between the arms of a U-shaped band 6 extending about the outer tube 1. A lever base 13 is positioned between the arms of the band 6 and also between the cam element 14 and the outer tube 1.

Figure 2:
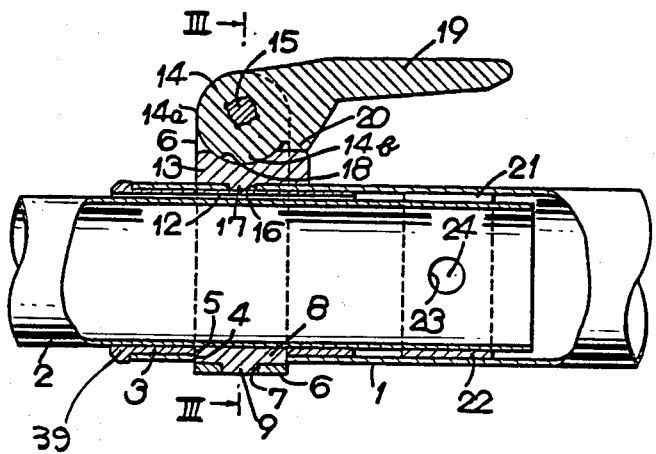
FIG. 2 is a longitudinal cross section of the lock assembly of FIG. 1.

Turning now to FIG. 2, the intermediate or bottom portion of the U-shaped band 6 overlies a first window opening 4 which may be rectangular in shape and is cut in the outer tube 1. A generally cylindrical sleeve insert 3 is coaxially interposed between the inner tube 2 and the outer tube 1. A second window opening 5 is cut in the sleeve insert 3, and is aligned with the first window opening 4 as best appreciated in FIG. 3.

The camming lever 19 is provided with a cam element 14 which has portion of reduced radius 14a and portion of greater radius 14b. The band 6 is drawn against the window opening 4 when the camming lever is brought to its down or locked position shown in FIG. 2, in which the portion of greater radius 14b acts against the concave surface 18 of the lever base 13. The band 6 is released by moving the lever 19 approximately 90 degrees upwardly to an erect position in which the cam portion of smaller radius 14a moves into the cam recess 18 of the base 13.

Figure 3:
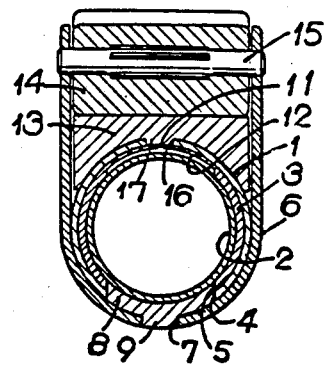
FIG. 3 is an axial cross section taken along line III—III in FIG. 2.

In a first embodiment of the invention illustrated in FIGS. 1-3, the lock includes a pressure plate 8 which has a concavely shaped inner surface conforming to the outer surface of the inner tube 2. The pressure plate 8 fits within the aligned first and second window openings 4, 5, and has a radially protruding interlock portion 9 which closely fits into an opening 7 in the band 6 so as to lock the band against rotation about the outer tube 1 since the pressure plate 8 is fixed against such rotation within the aligned window openings 4, 5. The sleeve 3 is likewise held against the rotation within tube 2 by the pressure plate 8 which is fixed within the window opening 4 of the outer tube 1.

The lever base 13 is provided with an interlock portion 17 extending radially inwardly into tube 2 through an opening 16 defined therein to similarly hold the base piece 13 against displacement along the surface of tube 2. The base 13 is further held against separation from the outer tube by the overlying cam lever, which in turn is retained by the U-shaped band 6. The entire lock assembly is thus held in place by cooperation of the various elements, thereby facilitating and speeding up the assembly of such locks.

The sleeve insert 3 is of generally cylindrical shape, and may have a collar abutting against the end rim of the outer tube 1 as seen in FIG. 2, thereby holding the collar against sliding movement into the outer tube 1.

The sleeve 3 has an axially extending wall portion of reduced thickness disposed diametrically opposite the pressure plate 8 as shown in FIGS. 2 and 3. The reduced wall thickness defines a longitudinal recess 12 in the inner surface of the sleeve 3. The sleeve is further split longitudinally by slot 11 which extends down the middle of the recess 12.

When the lever 19 is pivoted to its locked position shown in FIG. 2, the cam portion 14b of increased radius is urged against concave camming surface 18 of the base 13, thereby drawing the curved intermediate portion of the band 6 upwardly in FIG. 3. The pressure plate 8 is thus urged radially inwardly against the inner tube 2, wedging the inner tube towards the longitudinal recess 12, which extends the full length of the sleeve 3. The inner tube does not find support at a point diametrically opposite the pressure plate 8 due to the recess defined by the sleeve 3. Instead the inner tube is supported by the thicker wall portions of the sleeve 3 on either side of the recess 12. The locking forces are thus distributed circumferentially among three areas approximately equidistant, as suggested by the inwardly pointing arrows in FIG. 3. By so distributing the locking forces, the tendency to flatten the inner tube 2 by diametrically opposed locking forces conventionally applied in existing locks is avoided.

Figure 5:
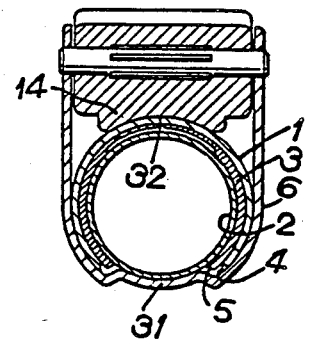
FIG. 5 is an axial section taken along the line V—V in FIG. 4.
Figure 4:
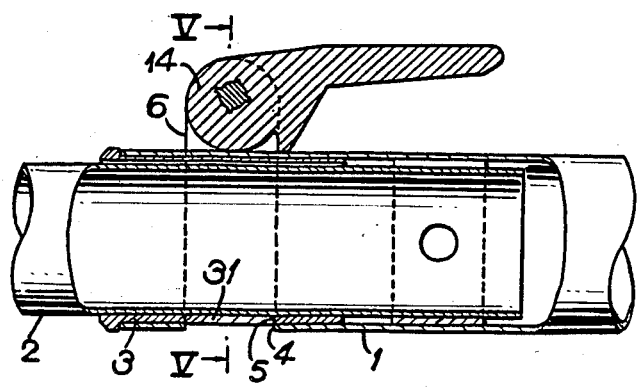
FIG. 4 is a longitudinal cross section of an alternate embodiment of the invention.

FIGS. 4 and 5 illustrate an alternate embodiment of the invention wherein the lever base 13 and the pressure plate 8 of FIGS. 2 and 3 have been eliminated. The cam element 14 of the camming lever has a camming surface 32 curved to conform to the surface of outer tube 1, as best appreciated in FIG. 5, and acts directly against the outer tube rather than against an intermediate base element. The intermediate portion of the U-shaped band 6 has been indented radially to define a clamping portion 31 disposed within the aligned window openings 4 and 5 in contact with the inner tube 2. When the band 6 is drawn upwardly in FIG. 5 by actuation of the camming lever, the clamping portion 31 applies direct radially inward locking force against the inner tube 2, urging the same towards the diametrically opposed longitudinal recess 12 defined by the sleeve insert 3, such that a distribution of the locking forces takes place as described in connection with the embodiment of FIGS. 2 and 3.

The lock in either of the illustrated embodiments further includes a detent sleeve 21 coaxially affixed to the inner tube 2 near its end by means of a radially inwardly extending portion 24 fitted into an opening 23 defined in the inner tube 2. The band 21 may, however, be affixed to the tube 2 by any other convenient means. The detent 21 limits the telescoping extension of the outer and inner tubes so as to prevent separation of the telescoping sections 1 and 2. If such separation is attempted, the detent sleeve 21 abuts against the inner end of the sleeve insert 3, thereby preventing further separation of the tube sections. The sleeve 3 is interlocked to the outer tube 2 by the pressure plate 8, which is disposed within the aligned window openings 4 and 5. Yet other means of securing the sleeve 3 to the outer tube 2 may be employed.

The camming lever 19 is desirably provided with a stop 20 which limits downward pivoting movement of the camming lever by abutting against the base 13 when the portion 14b of extended radius of the cam element 14 is correctly aligned with the base 13 for maximum locking force on the band 6. A similar stop element is provided in the alternate embodiment of FIGS. 4 and 5, but acts directly against the outer tube section 1.

While particular embodiments of the invention have been described and illustrated for purposes of clarity it will be understood that many changes, modifications and substitutions to the invention may be made by those possessed of ordinary skill in the art. The scope of the invention is therefore limited only by the following claims:

What is claimed is:

1. A lock for an adjustable support of the type having an inner tube telescopically slideable within an outer tube, said lock comprising:

level means mounted to said outer tube for applying radially inward locking force against a first load bearing area of said inner tube through a first window opening defined in said outer tube to thereby urge the side of said inner tube diametrically opposite said first load bearing area against an area of said outer tube diameterically opposed to said window opening;

load bearing means interposed between said inner and outer tubes including two substantially circumferentially spaced apart load bearing portions and an axially extending recess between said two load bearing portions and diametrically opposed to said first load bearing area and said first window opening such that the locking forces acting on said inner tube are distributed between said first load bearing area and said two load bearing portions, said first load bearing area and said two load bearing portions being substantially symmetrically disposed about the inner tube circumference to avoid deformation of said inner tube.

2. The lock of claim 1 wherein said first load bearing area and two load bearing portions are approximately circumferentially equidistant.

3. The lock of claim 1 wherein said load bearing means comprise a sleeve insert coaxially interposed between said inner and outer tubes and defining said axially extending recess in its inner surface diametrically opposed to said first window opening, said sleeve having a second window opening aligned with said first window opening in said outer tube, said sleeve insert having wall portions adjacent either side of said recess forming said two load bearing portions.

4. The lock of claim 1 wherein said lever means comprise a camming lever pivotably mounted to said outer tube.

5. The lock of claim 4 wherein said camming lever is mounted diametrically opposite to said first window opening and said lever means further comprise band means extending about said outer tube and drawn by actuation of said camming lever for applying said locking force to said inner tube through said first window opening.

6. The lock of claim 5 wherein said band means include a pressure plate disposed within said first window opening and having a surface bearing against said inner tube.

7. The lock of claim 6 wherein said pressure plate bearing surface conforms to the shape of said inner tube.

8. The lock of claim 6 wherein said band means include a U-shaped band and said lever means further comprise a lever base positioned between the arms of said band, said lever base including a concave surface underlying the cam portion of said camming lever and a portion closely fitting into an opening formed in said outer tube, said band being further secured to said pressure plate whereby said band, said lever base and said camming lever are affixed to said outer tube.

9. A lock for an adjustable support of the type having an inner tube telescopically slideable within an outer tube, said lock comprising:
a U-shaped band about said outer tube, said band having an intermediate portion between two arms, a sleeve insert coaxially interposed between said inner and outer tubes, a camming lever pivotably mounted between said arms, said intermediate portion of said band being drawn by actuation of said camming lever of applying locking force to said inner tube through aligned window openings in said outer tube and said sleeve insert, said sleeve insert defining a recess on its inner surface diametrically opposed to said aligned window openings, there being thicker first and second circumferentially spaced apart sleeve wall portions adjacent to either side of said recess such that the inner tube is urged towards said recess by locking force applied by the camming lever, the inner tube being supported against said locking force by said first and second wall portions of the sleeve insert, whereby the locking forces acting on the inner tube are distributed among said first and second wall portions and said intermediate portion of said U-shaped band to thereby avoid deformation of said inner tube.

10. The lock of claim 9 further comprising a pressure plate within said aligned window openings for transmitting locking force from said U-shaped band to said inner tube, said pressure plate and said first and second wall portions being substantially circumferentially equidistant.

11. The lock of claim 10 wherein said pressure plate is interlocked to said U-shaped band to thereby hold said band against rotation about said outer tube.

12. The lock of claim 11 further comprising a lever base between said camming lever and said outer tube, said lever base held between the arms of said U-shaped band, said lever base being interlocked to said outer tube against sliding movement along said outer tube, said lever base having a concave camming surface cooperating with said camming lever for drawing said U-shaped band against said outer tube in response to pivotal action of said camming lever.

13. The lock of claim 10 wherein said U-shaped band is indented at its intermediate portion to form a band portion positioned within said aligned windows and against the inner tube to thereby apply locking force to the inner tube.

14. The lock of claim 10 wherein said camming lever has a concavely curved camming surface acting against said outer tube.

15. The lock of claim 10 further comprising detent means mounted to said inner tube between said inner and outer tubes and near the end of said inner tube disposed within said outer tube such that said detent means abuts said sleeve insert to limit telescoping extension of said inner and outer tubes thereby to prevent separation of said tubes.

16. The lock of claim 15 wherein said detent means is a band encircling said inner tube.

17. The lock of claim 9 wherein said sleeve insert has a wall portion of reduced thickness defining said recess, said sleeve being split by an axially extending slot in said wall portion of reduced thickness.

18. The lock of claim 9 wherein said camming lever is provided with stop means to limit pivotal movement of said camming lever towards said outer tube.

19. In a telescoping support such as a tripod leg comprising an inner cylindrical tube telescopically slideable within an outer cylindrical tube, a locking lever for applying radially inward locking force to a first area of said inner tube through a first window opening defined in the outer tube to thereby urge the opposite side of the inner tube against an area of the outer tube diametrically opposed to said window opening, the improvement comprising:
a cylindrical sleeve coaxially interposed between said inner and outer tubes, said sleeve having a wall portion of reduced thickness defining an axially extending recess in its inner surface diametrically opposed to said first window opening, said sleeve insert having a second window opening opposed to said axially extending recess and aligned with said first window opening, said sleeve insert having a wall portion of greater thickness adjacent either side of said axial recess, said axial recess being dimensioned such that said inner tube is supported against locking force applied by said lever by said adjacent portions of greater thickness acting against circumferentially spaced apart second and third load bearing areas of said inner tube, thereby to distribute the locking forces acting upon the inner tube among said three areas so as to avoid deformation of said inner tube.

* * * * *